Jan. 13, 1959     F. W. LAWRENCE ET AL     2,867,963
ROTARY DISK-TYPE MOWER CUTTER MECHANISM
Filed Feb. 7, 1956
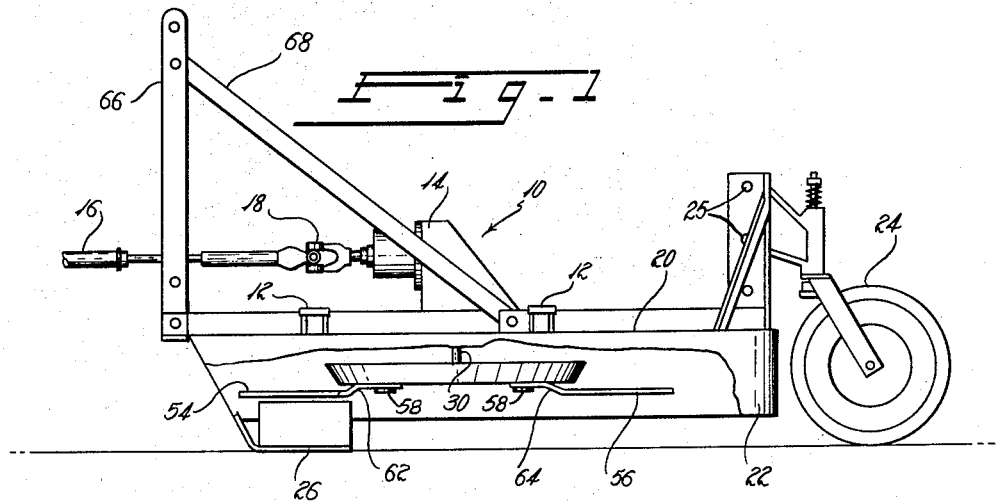
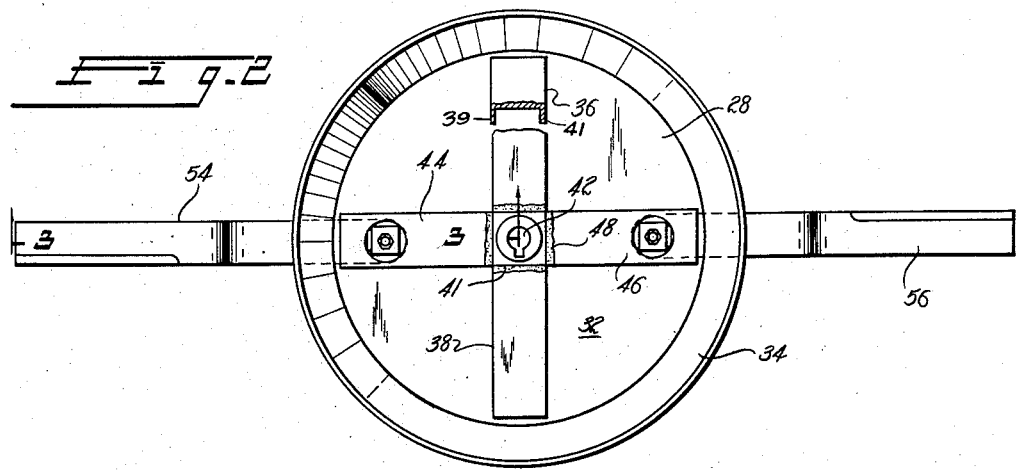
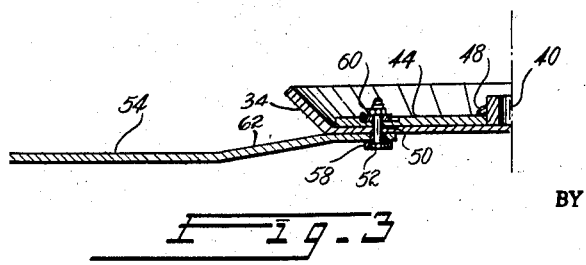
INVENTORS
FORBY W. LAWRENCE
ORBY W. LAWRENCE
BY Diggins & LeBlanc
ATTORNEYS United States Patent Office 2,867,963
Patented Jan. 13, 1959

2,867,963

ROTARY DISK-TYPE MOWER CUTTER MECHANISM

Forby W. Lawrence and Orby W. Lawrence, Selma, Ala., assignors to Lawrence Bros., Inc., Selma, Ala., a corporation of Alabama Application February 7, 1956, Serial No. 563,914

2 Claims. (Cl. 56—295)

This invention relates to a cutting and shredding machine for cutting vegetable stubs and the like and subjecting them to a shredding action and more particularly relates to a blade assembly which is not damaged by low lying stumps in the field being cut.

While the present invention is not necessarily confined to such a use it is particularly adapted to the shredding of all kinds of stalks remaining after harvest of various farm crops such as cotton, corn, cane, etc. It is very efficient in cleaning up land infested with heavy growths of weeds, briars and even bushes or small trees that have a growth of trunk or stalk up to as much as three inches in diameter. The cutting machine cuts all weeds, vines, stalks, etc. and subjects them to a shredding action before they pass out of and behind the machine.

In our prior Patent No. 2,634,571, issued April 14, 1953, we disclosed a cutting and shredding machine consisting of rotatable, hinged blades confined in a cutter housing. The cutting blades were partially enclosed on three sides and the top, whereby the ground formed the bottom of the closure and vegetation was subjected to the action of the cutting blades until it was shredded or cut into pieces small enough to pass out of the closure through the space between the housing and the ground. The blades of this machine were pivotally mounted on bars which were attached in fixed relationship to a single vertical rotating shaft so that the blades were radially extended by centrifugal force during normal operation, but could fall back and pass rocks, stumps, etc. which were too hard or too large for cutting.

While this cutting and shredding device proved to be generally satisfactory in operation it was found that upon striking rather heavy stumps the cutting blades and the bars on which they were pivotally mounted were frequently bent or damaged sufficiently to incapacitate the machine.

It is accordingly a primary object of the present invention to provide an improved cutting and shredding machine having rotating pivotally mounted blades which are so arranged as to pass over heavy low lying stumps without damage to the blades or other portions of the cutting machine.

It is another object of the invention to provide such an improved cutting and shredding machine wherein the blades are pivotally mounted upon the lowermost portion of a dished member whereby the blades and dished member ride up over any stumps which are encountered.

It is another object of the invention to provide an improved blade and blade holder assembly for cutting and shredding machines.

Further objects and advantages of the invention will become apparent upon reference to the following specification and claims and appended drawings wherein:

Figure 1 is a partly broken away side elevation of a cutting and shredding machine embodying and showing the blade holder arrangement of our invention;

Figure 2 is a plan view of the dished mounting disc upon which the blades are pivotally mounted; and Figure 3 is a partial vertical cross section of the dished disc of Figure 2 taken on the line 3—3.

Referring more particularly to the figures of the drawing there is shown in Figure 1 a cutting and shredding machine 10 comprised of frame member 12 which supports a gear box 14 driven by a drive shaft 16 and universal joint 18. The frame 12 carries a top cover 20 to which is attached a depending cutter housing 22. The machine rides on a caster type wheel 24 attached at the rear of the housing and upon skids 26 which may be attached to the lower edge of the cutter housing on each side of the machine to insure freedom of movement over uneven ground and to prevent the leading edge of the cutter housing from digging into the ground. Normally the skids need not touch the ground when the machine is being used on level ground.

The wheel 24 is positioned such that the lower edge of the cutter housing rides above the ground thus allowing the shredded vegetation to pass out under the machine. The wheel is adjustably mounted so that the bracket carrying the wheel may be bolted in various vertically spaced positions at the rear of train 12 by means of bolts 25. Thus the housing can be made to ride at any predetermined distance from the ground, thus regulating the size of the space between the ground and the housing walls, through which space the shredded material passes as the machine moves forward.

The blade holder of our invention consists of a dished disc 28 which is mounted on a vertical shaft 30 which extends through the top cover 20 to the gear box 14. The dished disc 28 consists of a flat bottom portion 32 having an upstanding outwardly flared flange 34 integrally attached thereto. The shape of the flange disc is that of a flat truncated cone as may be seen in Figure 1.

Within the dish formed by the upstanding flange 34 and on the bottom 32 are mounted a pair of channel-shaped cross braces 36 and 38 which are welded to the bottom 32 of the dished disc at 39 and 43. The cross braces 36 and 38 stop short of the center of the disc and are attached to a shaft block 40, as by welding 41. The shaft block is provided with a splined aperture 42 for receiving the shaft 30.

Extending at right angles to the channel-shaped cross braces 36 and 38 are a pair of heavy bars 44 and 46 which are attached to the bottom 32 of the dished disc by suitable means, and are also attached to the shaft block 40, as by welding 48. The bars 44 and 46 are apertured at 50 to receive bolts 52 pivotally mounting the cutter blades 54 and 56. The bolts 52 pass through shouldered lugs 58, on which the blades 54 and 56 are pivoted, and are secured by means of nuts 60.

The cross bracing afforded by the channel-shaped braces 36 and 38 and by the braces 44 and 46 greatly strengthens the dished disc so that it is not readily bent out of shape upon contact with hard objects such as stumps. It will be noted that the blades 54 and 56 are off-set at 62 and 64 to place the cutting edges normally below the bottom 32 of the dished disc 28. When the cutters strike a stump they pivot around the bolts 50 in a manner which prevents bending and the dished disc 28 due to its frusto-conical shape and tremendous strength merely rides up over the stump without being damaged in any manner.

A suitable means for drawing the machine is provided, such as the draw bar assembly 66 suitably braced at 68, although it is to be understood that other suitable means for propelling the cutter may be employed if desired.

It will be apparent from the foregoing that we have disclosed an improved form of cutting and shredding machine utilizing a cutter assembly which permits the machine to strike stumps and other solid obstructions without doing damage to the cutting blades or support therefor.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a cutter mechanism having a vertical drive shaft, a blade holder operatively connected to said drive shaft, said blade holder including a flat bottom portion and an upstanding outwardly flared peripheral flange attached thereto, a plurality of radial bracing members attached to the upper side of said bottom portion, and a pair of outwardly extending blades attached to said bottom portion by pivotal means passing through outer ends of opposed bracing members, each of said blades having a cutting portion offset downwardly from the plane of attachment of said blade to said bottom portion.

2. In a cutter mechanism having a vertical drive shaft, a blade holder operatively connected to said drive shaft, said blade holder including a flat bottom portion and an upstanding outwardly flared peripheral flange attached thereto, a shaft block attached to the center of said bottom portion and receiving said vertical shaft, a pair of channel shaped radial braces attached to the upper side of said bottom portion and joining said shaft block, a pair of opposed radial braces attached to the upper side of said bottom portion substantially normal to said channel shaped radial braces and a pair of outwardly extending blades attached to the underside of said bottom portion by pivotal means passing through outer ends of said opposed radial braces, each of said blades having a cutting portion offset downwardly from the plane of attachment of said blade to said bottom portion.

References Cited in the file of this patent

UNITED STATES PATENTS

| | | |
|---|---|---|
| 1,248,330 | Huish et al. | Nov. 27, 1917 |
| 2,471,367 | Cavaness | May 24, 1949 |
| 2,476,394 | Webb et al. | July 19, 1949 |
| 2,547,540 | Roberts | Apr. 3, 1951 |
| 2,728,182 | Fulton et al. | Dec. 27, 1955 |
| 2,787,881 | McDaniel | Apr. 9, 1957 |
| 2,793,484 | McNeill | May 28, 1957 |